Feb. 12, 1963    B. SOKOL    3,077,005
METHOD OF MOLDING SYNTHETIC RESINS
Filed April 17, 1959

INVENTOR.
BENJAMIN SOKOL
BY John J. Sullivan
ATTORNEY 3,077,005
METHOD OF MOLDING SYNTHETIC RESINS
Benjamin Sokol, Huntington Station, N.Y., assignor to Republic Aviation Corporation, Farmingdale, N.Y., a corporation of Delaware
Filed Apr. 17, 1959, Ser. No. 807,187
6 Claims. (Cl. 18—58.6)

This invention relates generally to molding processes and particularly to a method facilitating the molding of synthetic resins accurately to an ultimate configuration. While the present method is not limited to, it has particular utility in, the molding of relatively large configurations or surfaces.

In molding resins, the resin material is applied to the mold or form in a liquid or fluid state and then cured or hardened to its ultimate permanent shape. While being cured, whether at room temperature or at an elevated temperature, depending upon the particular resin, the resin invariably shrinks with respect to the mold. Thus, the resin tends to lift and separate from the mold, making an accurate or true reproduction of the resin to the mold surface difficult.

Heretofore, this tendency of the resin to shrink and separate has been overcome by the application of a suitable pressure thereon in opposition to the mold. Thus, autoclaves, pressure bags, mated molds, and the like, have been developed. Such devices, however, have their limitations, particularly where large surfaces of resin are to be molded. Large and complex structures become involved, requiring substantial pressure sources and in extreme cases the molding operation is virtually impossible.

The present invention, therefore, contemplates a method of molding resins or resin materials whereby the resin itself, i.e., the part being formed, acts as its own pressure bag or diaphragm. Moreover, the instant method employs the surrounding atmospheric or ambient air pressure to act on and against the workpiece to retain it properly to the mold.

More specifically, the present invention contemplates, among other things, the application of a relatively thin band of sealant material adjacent and along the defining edges of the mold. The resin is, thereafter, applied to the mold, including the edges thus treated, whereby an airtight seal is effected between the mold and the resin. Thus, during the curing operation the ambient air pressure acting on and against the outer surface of the resin serves to hold the resin against the mold until fully cured.

With the above and other objects in view, as will be apparent, this invention consists in the construction, combination and arrangement of parts all as hereinafter more fully described, claimed and illustrated in the accompanying drawings wherein:

Figure 1:
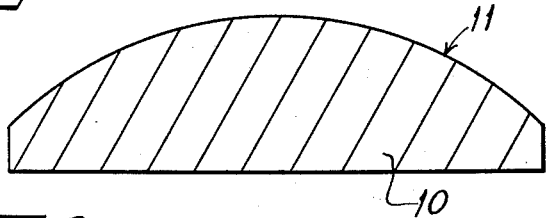
FIG. 1 is a section taken through a mold, the upper surface of which describes the contour desired of the ultimate resin article and constitutes the resin forming surface.
Figure 2:
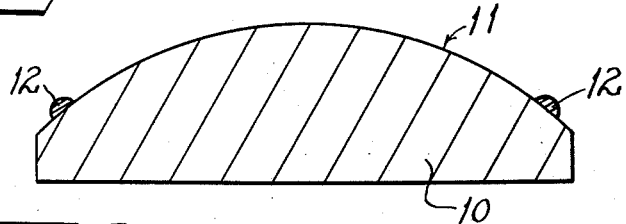
FIG. 2 is the same view of the mold after an application of sealant material to the forming surface adjacent its outer edges.
Figure 3:
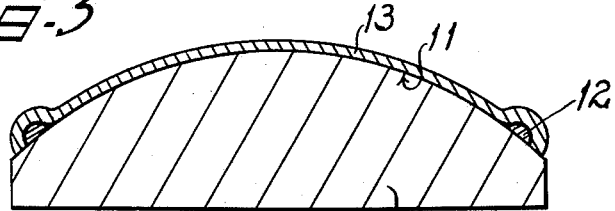
FIG. 3 is the same as FIG. 2 with a parting agent applied to the forming surface of the mold.
Figure 4:
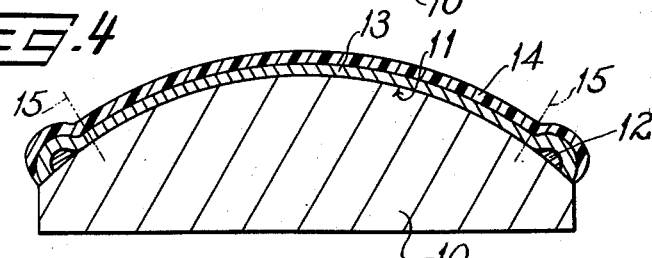
FIG. 4 is the same as FIG. 3 with one or more coatings of the synthetic resin applied thereto.
Figure 5:
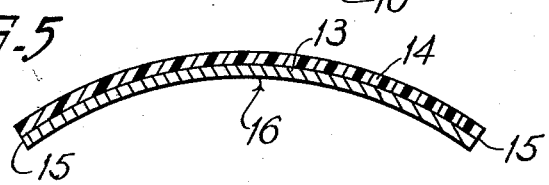
FIG. 5 is a section of the ultimate part or resin including the parting agent after it has been cured, removed from the mold and the edges trimmed.

Referring more particularly to the drawings, 10 designates a mold formed of non-porous material having a surface 11 which describes the desired configuration of the end article. Where the material of the mold 10 is porous, the surface 11 is made non-porous by impregnating it with a synthetic resin and curing the resin thus applied.

In order to facilitate separation of the end article of resin from the forming surface of the mold 10, a parting agent 13 is employed. This parting agent may be a film type such as, for example, polyvinyl alcohol, cellulose acetate, etc., or a wax type, such as paraffin, carnauba, etc. Since the wax type parting agent is preferentially adherent to the mold surface rather than the resin, if used, it is applied to the forming surface. Thereafter, a relatively thin band 12 of sealant material, either a tacky type such as, for example, zinc chromate, or a soft elastomer like soft rubber, etc., is applied to the surface 11 adjacent its edges.

When, on the other hand, a film type parting agent is employed, the band or sealant 12 is applied in the same way, however, prior to the application of the parting agent. As opposed to the wax type of parting agent, the film type is preferentially adherent to the resin.

In either of the above cases, the synthetic resin 14 which comprises the material of the article to be formed is then applied over the surface 11 and band 12. In some instances, it may be desired to reinforce the resin with interlayers of strengthening material, such as glass fabric, etc.

The resin thus disposed is thereafter cured at room temperature or at a slightly elevated temperature. Depending upon the particular resin used, higher temperatures may be required for curing. The only limitation as to the degree of such higher temperatures, however, is that they do not exceed the degradation temperature of the sealant material.

When the resin has thus been fully cured it, together with the parting agent, is removed from the mold and, where desired or necessary, the edges thereof may be cut off at and along a trim line 15 to produce the end article 16. Such particles of the sealant 12 as may adhere to the resin 14 and/or the parting agent 13 may thereafter be readily removed by washing it in a solution of suitable solvent without distorting or otherwise affecting the resin article 16.

Following the above method, the sealant 12 serves to prevent ambient air from passing between the resin 14 (plus the parting agent 13, if of the film type) and the surface 11 of the mold 10 during the curing operation. The tacky and/or resilient characteristics of the sealant 12 permits it to follow the resin 14 in its lineal movement or shrinkage during curing to maintain the resin 14 and associated surface 11 in an airtight relation. Thus, the ambient air pressure acting on the other side of the resin is unopposed to act as a force on and against the resin and maintain it in flush contact at all times with the surface 11.

What is claimed is:

1. The method of molding synthetic resin consisting in forming a non-porous surface, applying a tacky material to the surface adjacent and continuously along the edges thereof, coating the suurface and tacky material with a film type parting agent, applying synthetic resin over the parting agent and tacky material, curing the resin, and removing the cured resin from the surface.

2. The method of molding synthetic resin consisting in forming a non-porous surface, applying zinc chromate paste to the surface at and continuously along the edges thereof, coating the surface and paste so applied with cellulose acetate, applying synthetic resin over the cellulose acetate and paste, curing the resin, and removing the cured resin from the surface.

3. The method of molding synthetic resin to a surface consisting in impregnating the surface with synthetic resin, curing the resin, applying a relatively thin band of sealant material to the surface adjacent the edges thereof, coating the surface and band with a film type of parting agent, covering the parting agent and sealant material with synthetic resin, curing the resin, removing the cured resin and parting agent from the surface, and washing the resin in a solvent to remove the parting agent therefrom.

4. The method of molding synthetic resin consisting in forming a non-porous surface, applying a wax type of parting agent to the surface, applying a sealant material at and continuously along the edges of the surface, applying synthetic resin to the surface over the parting agent and sealant material, curing the resin, and removing the cured resin from the surface.

5. The method of molding synthetic resin consisting in forming a non-porous surface, applying a sealant material adjacent and continuously along the edges of said surface, applying a synthetic resin over the surface and sealant material, curing the resin, and removing the cured resin from the surface.

6. The method of claim 5 with the additional step of trimming the edge of the cured resin inwardly of the sealant material.

References Cited in the file of this patent

UNITED STATES PATENTS

| | | |
|---|---|---|
| 2,370,562 | Meunier | Feb. 27, 1945 |
| 2,883,315 | Palmquist | Apr. 21, 1959 |
| 2,934,399 | Morse | Apr. 26, 1960 |